Oct. 1, 1929. O. ALTENBACH 1,729,919

TOP FOR AUTOMOBILE RUMBLE SEATS

Filed May 9, 1927

INVENTOR
Otto Altenbach;
BY
ATTORNEY

Patented Oct. 1, 1929

1,729,919

UNITED STATES PATENT OFFICE

OTTO ALTENBACH, OF LOS ANGELES, CALIFORNIA

TOP FOR AUTOMOBILE RUMBLE SEATS

Application filed May 9, 1927. Serial No. 189,957.

My invention relates to automobile bodies of the coupé or roadster type in which a rumble or jump seat is provided at the rear of the driver's seat.

It is a purpose of my invention to provide a cover or top for the occupants of a rumble seat in automobile bodies of the above described character to protect the occupants against the sun, wind and rain, in order that they may ride with substantially the same comfort as those occupying the driver's seat.

It is also a purpose of my invention to provide a top for rumble seats in the form of an attachment to be applied to automobiles already in use and which is characterized structurally by its simplicity, low cost of manufacture, ready adaptability, removability and collapsability to permit it to be stored in a relatively small space when not in use.

I will describe only one form of top for rumble seats embodying my invention, and will then point out the novel features thereof in claims.

In the accompanying drawings Fig. 1 is a view showing, in side elevation, one form of rumble seat top embodying my invention in applied position to an automobile.

Figure 1:
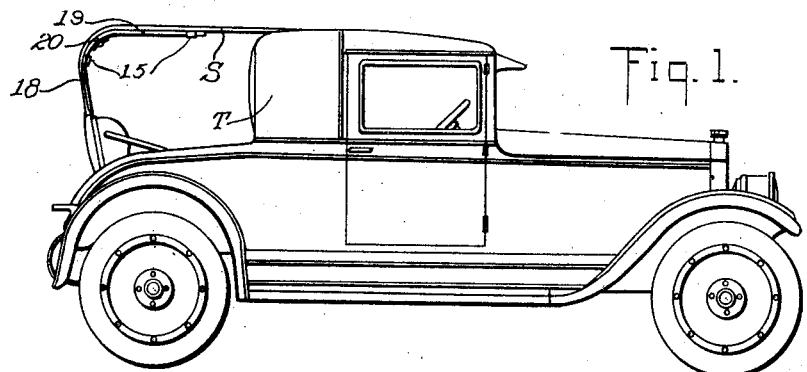

Referring specifically to the drawings, my invention in its present embodiment comprises a cover sheet S formed of suitable flexible and waterproof material and of suitable length and width so that when supported in extended position it will function to protect the occupants of the rumble seat against action of the elements. This cover sheet is adapted to be supported in extended position by means of a frame structure capable of being collapsed into a relatively small space and so as to permit the cover sheet to be rolled upon itself to facilitate storage. The top in its entirety is in the nature of an attachment and is capable of being readily applied to an automobile and readily detached therefrom for storage, and all without in any way modifying the present construction of automobile bodies or tops.

The frame for the cover sheet includes bars 15, which are suitably and permanently secured to and extend transversely of the sheet at intervals along the length of the latter. In the present instance, two such bars are provided which may be formed of wood, metal or any other suitable material sufficiently rigid to support the cover sheet against sagging. A third bar 16 is permanently secured to the lower and rear end of the cover sheet S, and this bar is provided at intervals along its length with a spring clip 17 designed to embrace the upper edge of the rumble seat back for rigidly securing the bar to the seat back. Pivoted upon the opposite ends of the bar are a pair of arms preferably curved and each composed of a lower bar section 18 connected to an upper bar section 19 by means of hinge 20 in order to permit the folding of the section 19 on the section 18.

Figure 2:
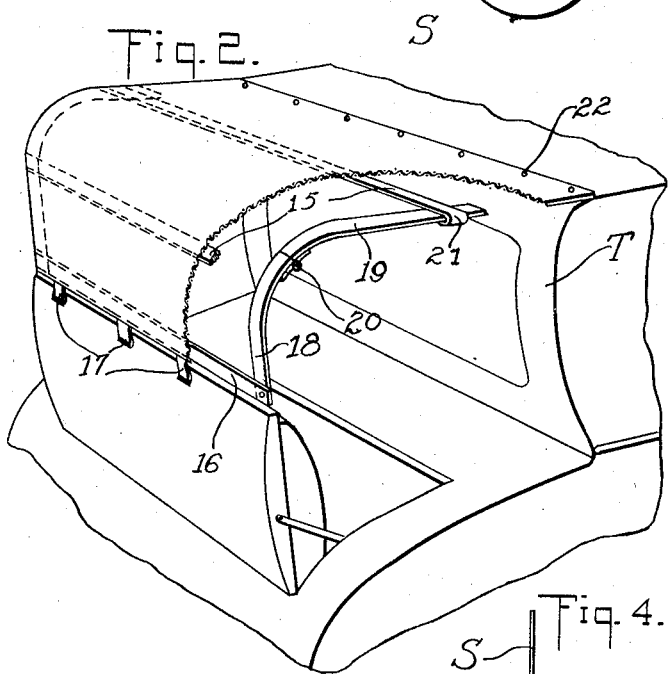
Fig. 2 is a fragmentary perspective view of the automobile body showing the rumble seat top in applied position, and with a portion of the latter broken away to reveal the structure of the supporting frame.

With the section 19 extended as illustrated in Fig. 2, the hinge 20 serves to rigidly support such section on the section 18 in order that it may properly function in supporting the cover sheet in extended position.

Figure 3:
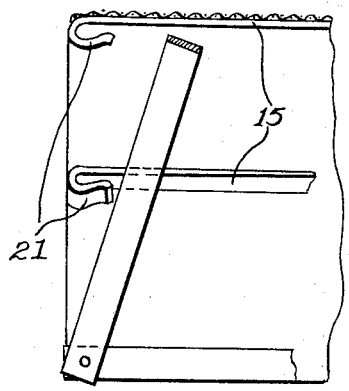
Fig. 3 is a fragmentary transverse sectional view of the top shown in the preceding views with one of the supporting arms in released position.
Figure 4:
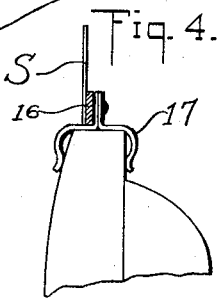
Fig. 4 is a fragmentary sectional view showing the clips of the top in applied position to the back of the rumble seat.

The side arms are adapted to be engaged by spring clips 21 formed on the opposite ends of the bars 15 by bending the ends of the bars upon themselves as clearly illustrated in Fig. 3. Through the medium of these clips 21, the side arms are detachably secured to the bar 15 to maintain the frame structure in extended position for supporting the cover sheet above the rumble seat. The forward end of the cover sheet is provided with one part of a plurality of separable fasteners of the head and socket type as shown in Fig. 2, these fastener parts indicated at 22 are arranged at intervals along the forward edge of the cover sheet for engagement with the other parts of the fasteners which are adapted to be attached to the usual top T for the driver's seat of the automobile. Preferably the socket parts of the fasteners are secured to the cover sheet, while the head parts are secured to the top T. In this manner a detachable connection is provided between the top T and the forward end of the cover sheet, which serves to maintain the cover sheet extended when the frame structure is in set up position. To collapse the frame structure incident to the removal of the top from the rumble seat, the side arms composed of the sections 18 and 19 are swung inwardly towards each other to disengage the clips 21. The sections 19 can now be folded upon the sections 18, and the latter moved into substantially parallel position with respect to the bar 16. By removing the clips 17 from the rumble seat back and freeing the forward end of the cover sheet by separation of the fasteners, the entire top can now be removed from the automobile. The cover sheet can be rolled upon itself, so that with the frame structure collapsed the device as a unit will occupy a minimum space for convenient storage within the automobile.

Although I have herein shown and described only one form of rumble seat top embodying my invention, it is to be understood that various changes and modifications may be made herein without departing from the spirit of the invention and the spirit and scope of the appended claims.

I claim as my invention:

1. An attachment top for the rumble seats of automobiles comprising a cover sheet of flexible material, transverse bars secured to the sheet at spaced intervals along the length of the latter, certain of the bars having terminal clips thereon, side arms pivoted on one of the bars and movable to engage the terminal clips and to thus hold the bars in the cover sheet in occupant covering position above the seat, and clips on one of the bars adapted to embrace the top of the rumble seat back for securing one end of the cover sheet to the seat, and fastening members at the other end of the cover sheet adapted to detachably secure the cover sheet to the top of an automobile.

2. An attachment top for the rumble seat of automobiles comprising a cover sheet, bars secured to the sheet, certain of which are provided with abutments, arms pivoted on one of the bars to swing lengthwise of the other bars and engage within the abutments to definitely limit the outward movement of the arms relative to each other, means adapted for detachably securing that bar on which the arms are pivoted to a seat back, and means adapted for detachably securing the cover sheet to the top of an automobile.

3. An attachment top for the rumble seat of automobiles comprising a cover sheet having means provided with clips disposed at the side edges of the cover sheet and opening inwardly, means for detachably securing the opposite ends of the cover sheet to the top of an automobile and the rumble seat respectively, and arms on which the cover sheet is adapted to be supported, mounted for movement to occupy a folded and extended position, which latter position they engage within the clips to sustain the cover sheet extended.

4. An attachment top for the rumble seat of automobiles comprising a cover sheet, bars at intervals along the length of the cover sheet for supporting the latter in extended position, one of the bars having means for securing the same to a rumble seat, and arms pivoted on the last-mentioned bar to swing about horizontal axes and upwardly into supporting position in respect to the remaining bars.

5. An attachment top for the rumble seat of automobiles comprising a cover sheet, bars at intervals along the length of the cover sheet for supporting the latter in extended position, one of the bars having means for securing the same to a rumble seat, arms pivoted on the last-mentioned bar to swing about horizontal axes and upwardly into supporting position in respect to the remaining bars, and means for detachably securing the arms to the bars when in supporting position.

6. An attachment top for the rumble seat of automobiles comprising a cover sheet, bars secured to the sheet, certain of which are provided with clips forming sockets arranged in confronting relation and opening towards each other, arms pivoted on one of the bars to swing lengthwise of the other bars for engagement within said sockets to thereby definitely limit the outward movement of the arms relative to each other, means for detachably securing to a seat back, that bar on which the arms are pivoted, and means for detachably securing the cover sheet to the top of an automobile.

OTTO ALTENBACH.